P. M. HOTCHKIN.
FLOODLIGHT PROJECTOR.
APPLICATION FILED JUNE 12, 1916.
1,240,452.
Patented Sept. 18, 1917.
2 SHEETS—SHEET 2.
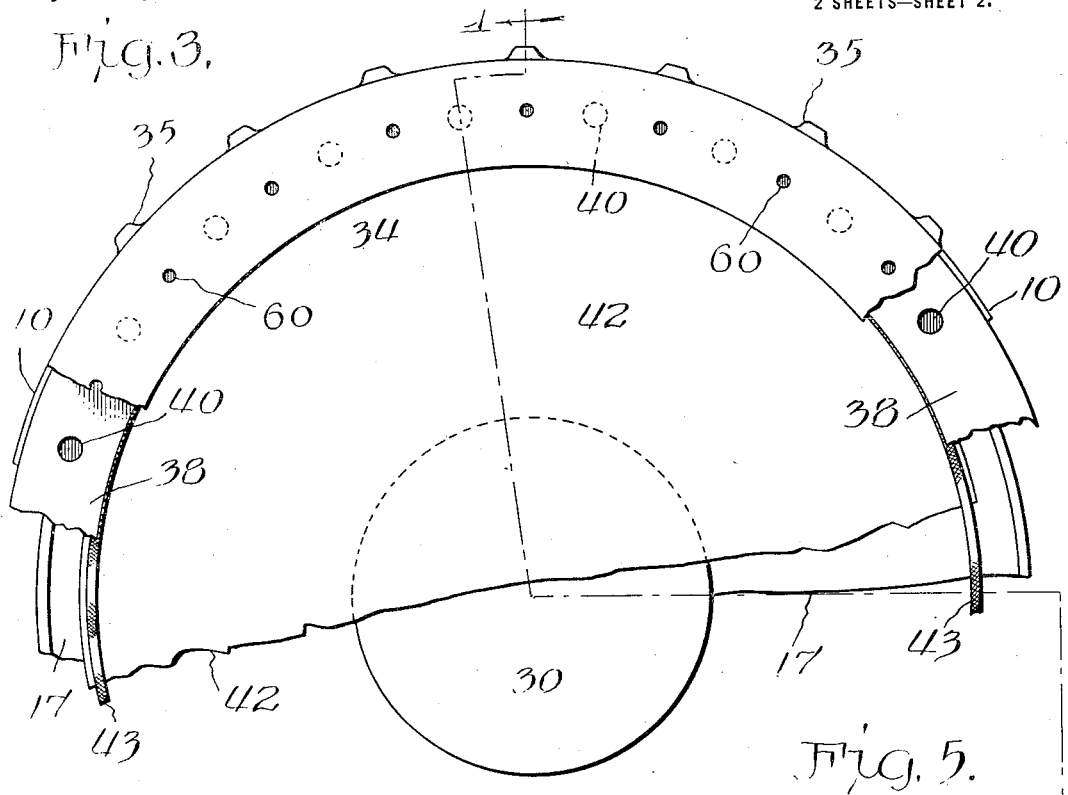
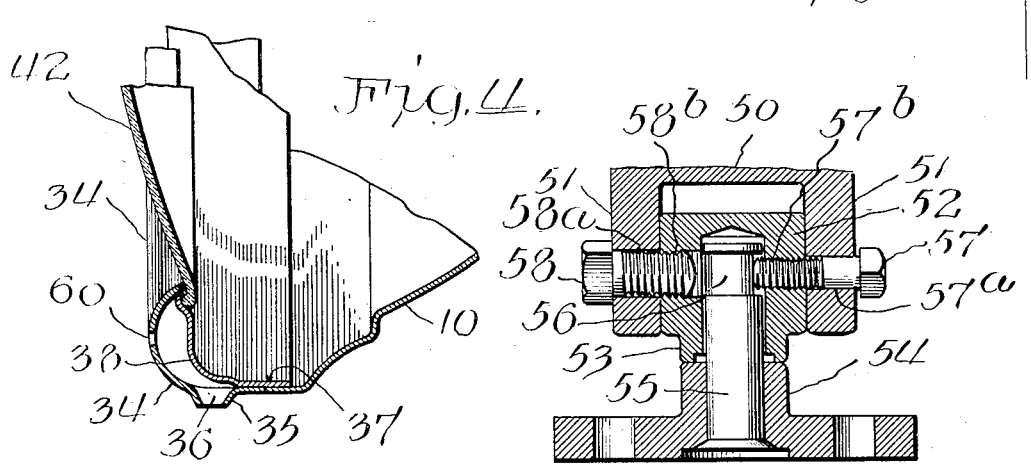
Witness
Inventor:
Paul M. Hotchkin
Attorneys

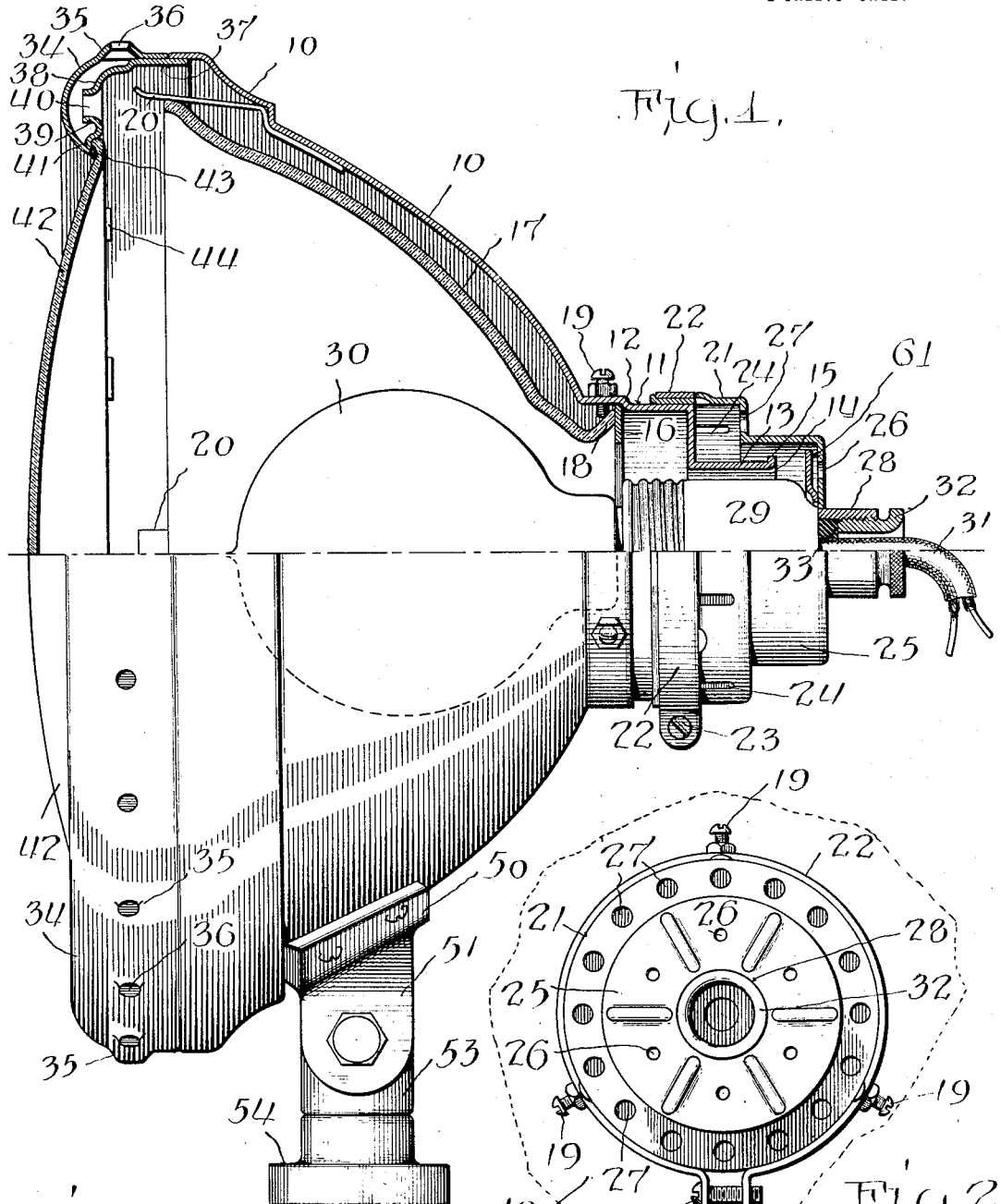

UNITED STATES PATENT OFFICE.

PAUL M. HOTCHKIN, OF CHICAGO, ILLINOIS.

FLOODLIGHT-PROJECTOR.

1,240,452.  Specification of Letters Patent.  Patented Sept. 18, 1917.

Application filed June 12, 1916. Serial No. 103,086.

*To all whom it may concern:*

Be it known that I, PAUL M. HOTCHKIN, a citizen of the United States, and a resident of the city of Chicago, county of Cook, and State of Illinois, have invented certain new and useful Improvements in Floodlight-Projectors, of which the following is a specification.

My invention pertains to a device for projecting light over a considerable area so as to secure the illumination of large objects, such, for instance, as the illumination of the façade of a building. The system of illumination, known as "floodlighting," comprises the disposition of a suitable light projector or projectors, inclosed within suitable protecting housings whereby a beam of light composed of a multiplicity of light rays, is directed upon divers portions of the building. Owing to the conditions subsisting with this system of illumination, it becomes necessary to provide a light-projector that is weather-proof and capable of draining in the event moisture reaches the interior; and also of a ventilating character, so that the intense heat generated by the high-voltage lamp or bulb may escape from the housing, thereby preventing the cracking or breaking of the reflector or bulb. It is also necessary in a projector of this type to provide means whereby the projector may be adjusted so that the beam will be projected in any desired direction and with a desired amount of diffusion.

It is one of the objects of my invention to construct a floodlighting projector in a manner so that it is both self-draining and self-ventilating in any position or angle to which it may be adjusted. It is also an object of my invention to provide means in a projector of this type whereby the point of luminosity may be adjusted with respect to the reflector so as to focus the light into a beam or to scatter it according to the nature of the illumination desired. Further objects of my invention will be obvious to others after an understanding of my invention is had.

I prefer to accomplish the divers objects of my invention by the means and in the manner hereinafter fully described and as more particularly pointed out in the claims, reference being had to the accompanying drawings which form a part of this specification, wherein,—

Figure 1 is a side elevation of my improved floodlighting projector, the upper half whereof is shown in vertical central section.

Fig. 2 is a rear elevation of the lamp and socket-holding, adjustable cap.

Fig. 3 is a vertical front elevation of the upper portion of my projector, the divers parts being broken away to illustrate their construction and location.

Fig. 4 is a detail fragmentary section taken through the lower portion of the structure adjacent the door or closure.

Fig. 5 is a detail sectional view of the supporting bracket, taken at substantially right-angles to the view shown in Fig. 1.

Referring to the drawings, it will be observed my projector preferably comprises a substantially hemispherical or bell-shaped body portion or shell, 10, the central rear portion whereof terminates in a cylindrical member or throat, 11, extending axially from said shell, 10, and provided with a shallow, annular shoulder, 12. The outer portion of the member, 11, is reduced as at 13, to provide a restricted opening, 14, into the interior of the shell, 10, and the edge of this reduced portion, 13, is bent or flared outwardly to provide a lip, 15, as shown in Fig. 1 of the drawings. The shoulder, 12, heretofore mentioned, provides a seat upon which an annular ring, 16, rests and a concave reflector, 17, having a flared neck, 18, is positioned upon said annular ring and securely mounted by means of screws, 19, tapped through the adjacent portion of the member, 11, between the shoulder, 12, and the shell, 10. Spring-clips, 20, of suitable shape are mounted adjacent the outer open portion and inner wall of the shell, 10, and are adapted to engage and retain the flared or bell-shaped mouth or open end of the reflector, 17, and also act as a cushion to prevent the reflector from breaking through accidental jarring.

The throat, 11, is adapted to be partially inclosed within a suitable socket-holding cap, 21, that engages the portion, 11, and is frictionally clamped thereto by an annular ringlike strap, 22, the ends whereof are adapted to be drawn toward each other by a screw, 23. The widest portion of this cap is provided upon its cylindrical wall with longitudinally elongated slots, 24, and said cylindrical wall is reduced in diameter, as at 25, so as to approach the reduced throat, 13, of the housing or shell, 10, and the rear portion or end edge of this cap is turned laterally so that two lateral walls are provided, each having perforations, 26 and 27, therein for ventilation. A cylindrical hollow plug, 28, is secured in the central rear opening of the cap and a suitable electric socket sheathing, 29, is secured to the inner end thereof, so that a lamp or bulb, 30, of any desired type, preferably the gas-filled type, may be positioned therein. It will be observed that the socket and lamp are carried independently of the reflector, by the cap heretofore mentioned, and by releasing the clamping ring, 22, the cap, and consequently the lamp or bulb, may be moved axially of the reflector, 17, and thus permit the point of luminosity to be positioned at the place most desirable for the particular character of illumination desired.

In order to form a tight fit, the electric-circuit cable, 31, is passed through the tubular plug, 28, and a cylindrical nut, 32, is screwed therein until its inner portion engages the rubber gasket, 33, causing the expansion of the latter and tightly sealing the space between the plug and the cable. It will be observed that while the socket and lamp are adapted to be adjusted, suitable ventilation is also had through the perforations, 26 and 27, and any water or moisture that might reach the interior will be prevented from touching the reflector or the socket on account of the lip, 15, on the neck, 13, and the said water or moisture will drain from the lowermost slots, 24. A baffle-plate, 61, is secured to the inner portion of the rear wall of the cap, 25, and is disposed in front of but spaced from the openings 26 so as to prevent water from being blown into the projector through the said openings.

The forward open portion of the projector is preferably closed by a door or similar closure. This element preferably comprises a double-wall door, the outer wall, 34, being of substantially circular outline in elevation and approximately the same diameter as the widest portion of the housing or shell, 10. This outer wall is provided with suitable embossments, 35, having openings, 36, therein, the objects of which will be hereinafter explained. The inner wall, 37, of the door is of substantially the same outline as the open portion of the shell, 10, and its outside diameter is substantially the same as the inside diameter of said shell, so that a tight fit will be obtained, as shown in Figs. 1 and 4 of the drawings. The portion, 37, of this wall is welded or otherwise rigidly secured to the outer wall, 34, and is provided with a suitable forwardly bulged portion, 38, that is provided with embossments, 39, upon its forward or outer face, said embossments having central openings, 40, therein. The adjacent edges of the inner and outer walls are brought together, as shown at 41, and secured together preferably by welding or sweating and a suitable front plate or bull's-eye, 42, of glass or the like, is positioned in the circular opening formed by these inner and outer annular walls of the door. A waterproof gasket, 43, of any suitable material, is positioned between the inner edges of the door and the glass, for the purpose of making a water-tight fit, and spring-clips, 44, securely hold the glass in position.

From the preceding it will be observed that any water or moisture that might enter through the upwardly disposed openings, 36, will gravitate around the space formed between the two walls of the door and will leave this space through the lowermost openings, 36. It will also be observed that the heated air will rise and pass through the openings, 40, and after passing around the inner wall, will pass out the front door through the openings, 60, or leave through the uppermost openings, 36, thus permitting a suitable circulation of air and also preventing any moisture reaching the reflector and lamp positioned therein.

In order to mount this projecting device, I have provided a suitable bracket, which is illustrated in detail in Fig. 5 of the drawings. The bracket preferably comprises a metal plate, 50, of suitable curvature to fit the shell, 10, and form a seat therefor. Two lateral lugs, 51, project downwardly therefrom and have disposed between the same a cylindrical barrel, 52, of substantially T-shaped outline, the lower portion, 53, whereof is mounted upon a suitable swivel or fastening-plate, 54, having openings through which bolts or screws may be passed to secure the fixture in the locality desired. The member, 52, is centrally bored from the lower reduced portion, 53, and the swivel plate, 54, is also centrally bored so as to permit of the passage upwardly therethrough of the rigid swivel column, 55, near the upper end of which is provided an annular channel, 56. A set screw, 57, and bolt, 58, extend through horizontal apertures, 57$^a$, and 58$^a$, respectively, in the lugs, 51. It will be noted that set screw, 57, is somewhat longer than bolt, 58. The bolt, 58, extends into and coacts with an interiorly threaded bore, 58$^b$, in the barrel, 52, for the purpose of clamping the lug, 51, to the barrel and thereby securing the desired vertical adjustment or tilt of the projector. The set screw, 57, is adapted to extend through an interiorly threaded bore, 57$^b$, in the barrel, 52, and into the annular channel, 56, and against the swivel column, 55, so as to both secure the housing against accidental removal and to afford facilities to secure the projector in its desired position upon the swivel.

What I claim as new is:—

1. A housing for light producers having an opening, a closure for the opening comprising an inner and outer wall connected to form a chamber, a portion of one wall standing at an angle to a portion of the other wall, the angularly disposed portions of the walls having apertures for the circulation of air, and the said outer wall having outwardly extending water guards around said aperture.

2. A housing for light producers having an opening, a closure for the opening comprising an inner and outer wall connected to form a chamber, a portion of one wall standing at an angle to a portion of the other wall, the angularly disposed portions of the walls having apertures for the circulation of air, the said outer wall having outwardly extending portions forming water guards around said aperture.

3. A housing for light producers having openings, a ventilated closure for one of the openings, a ventilated socket casing extending from the other opening and having a moisture confining channel, and a closure for the end of the socket casing having ventilating and draining apertures.

4. A housing for light producers having openings, a ventilated closure for one of the openings, a ventilated socket casing extending from the other opening and having a moisture confining channel, a closure for the end of the socket casing having ventilating and draining apertures, and a shield guarding certain of the ventilating apertures.

5. A housing for light producers having openings, a ventilated closure for one of the openings, a closure for the end of the socket casing having ventilating and draining apertures, a tube connected to and communicating with the closure for electrical conductors, and means for effecting a tight joint between the conductor and the tube.

6. In a housing for light producers, a casing having an opening at one end and a hollow integral extension at the opposite end forming a socket casing, said extension having a moisture confining channel.

7. In a housing for light producers, a casing having an opening at one end and a hollow integral extension at the opposite end forming a socket casing, said extension having a moisture confining channel, and a closure for the end of the socket casing having ventilating and draining apertures.

Signed at Chicago, county of Cook and State of Illinois, this 9th day of June 1916.

PAUL M. HOTCHKIN.

Witnesses:
WM. HAROLD EICHELMAN,
H. SLACK.